(12) United States Patent
Hammerschmidt

(10) Patent No.: US 7,918,135 B2
(45) Date of Patent: Apr. 5, 2011

(54) PRESSURE SENSOR INCLUDING THERMAL SELFTEST

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 11 days.

(21) Appl. No.: 12/364,884

(22) Filed: Feb. 3, 2009

(65) Prior Publication Data

US 2010/0192694 A1    Aug. 5, 2010

(51) Int. Cl.
*G01L 9/12*    (2006.01)
(52) U.S. Cl. .......................................................... 73/718
(58) Field of Classification Search .................... 73/599, 73/718, 726, 777
See application file for complete search history.

(56) References Cited

U.S. PATENT DOCUMENTS

| 4,320,664 | A | 3/1982 | Rehn et al. |
| 5,723,784 | A * | 3/1998 | Lembke et al. ............. 73/204.26 |
| 6,341,528 | B1 * | 1/2002 | Hoffman et al. ................ 73/777 |
| 6,427,539 | B1 * | 8/2002 | Chen et al. ....................... 73/726 |
| 7,415,885 | B2 | 8/2008 | Reinwald et al. |
| 2008/0041164 | A1 | 2/2008 | Cottles et al. |
| 2009/0211360 | A1 * | 8/2009 | Rapps et al. ..................... 73/599 |

OTHER PUBLICATIONS

"A Comibed Piezoresistive/Capacitive Pressure Sensor with Self-Test Function Based on Thermal Actuation", Dirk DeBruyker, et al., IEEE, 1997 (4 pgs.).

* cited by examiner

*Primary Examiner* — Jewel Thompson
(74) *Attorney, Agent, or Firm* — Dicke, Billig & Czaja, PLLC

(57) ABSTRACT

A semiconductor device includes a diaphragm, a sensing element, and a circuit. The sensing element is configured to sense deflection of the diaphragm. The circuit is configured to heat the diaphragm to induce deflection of the diaphragm.

23 Claims, 4 Drawing Sheets

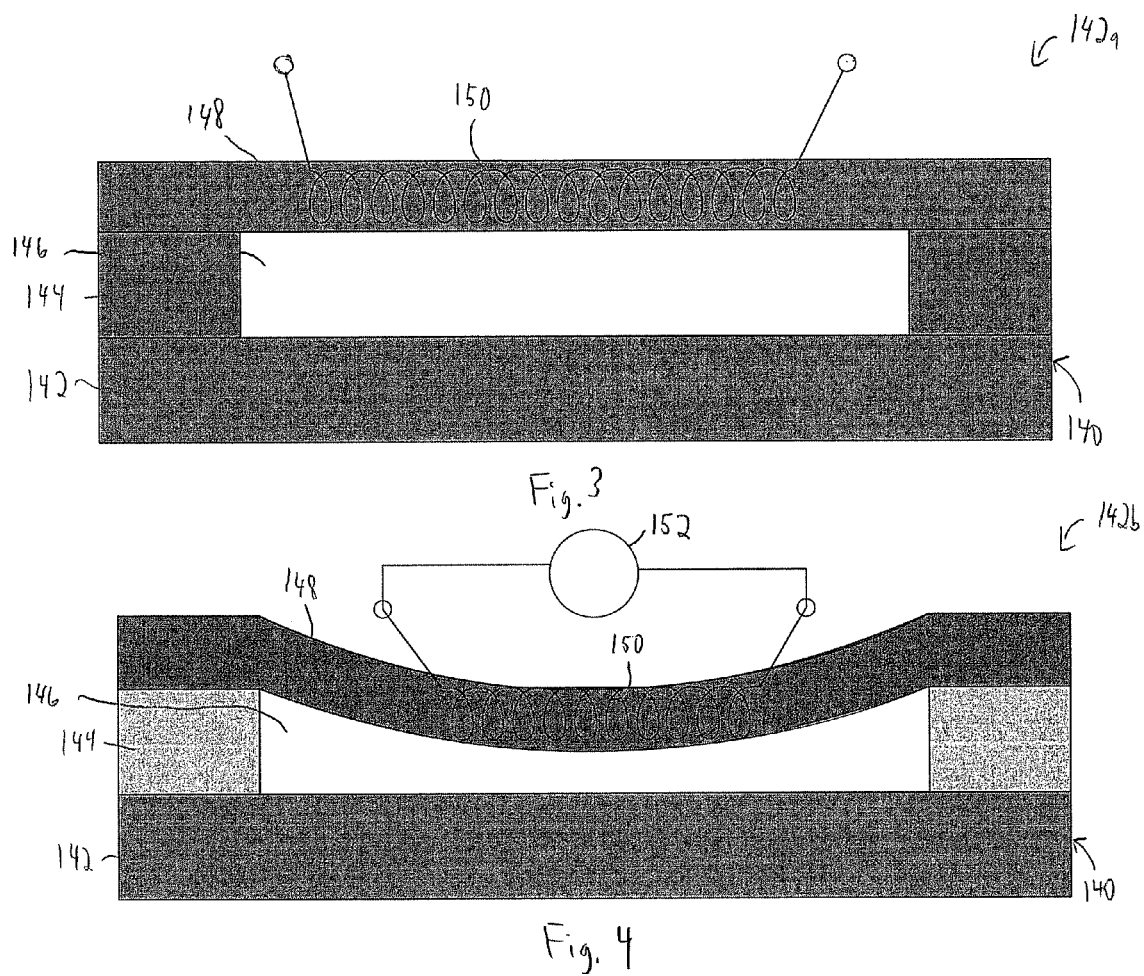
Fig. 3
Fig. 4
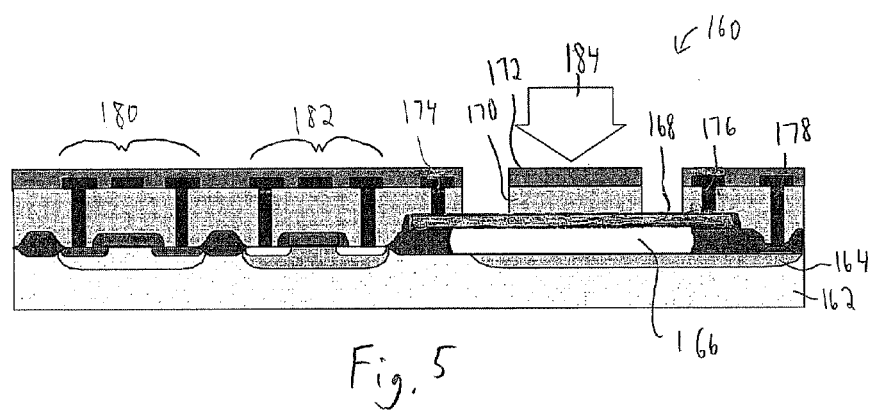
Fig. 5

PRESSURE SENSOR INCLUDING THERMAL SELFTEST

BACKGROUND

Pressure sensors are typically used to measure the pressure of a liquid or a gas, such as air. Pressure sensors typically provide an output signal that varies based on the pressure sensed by the pressure sensor. The pressure applied to a pressure sensor that is installed in the field typically cannot be controlled. This lack of control over the applied pressure makes it difficult to test the pressure sensor to verify that it is operating correctly and measuring the correct pressure in response to the applied pressure.

For these and other reasons, there is a need for the present invention.

SUMMARY

One embodiment provides a semiconductor device. The semiconductor device includes a diaphragm, a sensing element, and a circuit. The sensing element is configured to sense deflection of the diaphragm. The circuit is configured to heat the diaphragm to induce deflection of the diaphragm.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3 is a diagram illustrating one embodiment of a pressure sensor element in a first state.

FIG. 4 is a diagram illustrating another embodiment of a pressure sensor element in a second state.

FIG. 5 illustrates a cross-sectional view of another embodiment of a pressure sensor.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
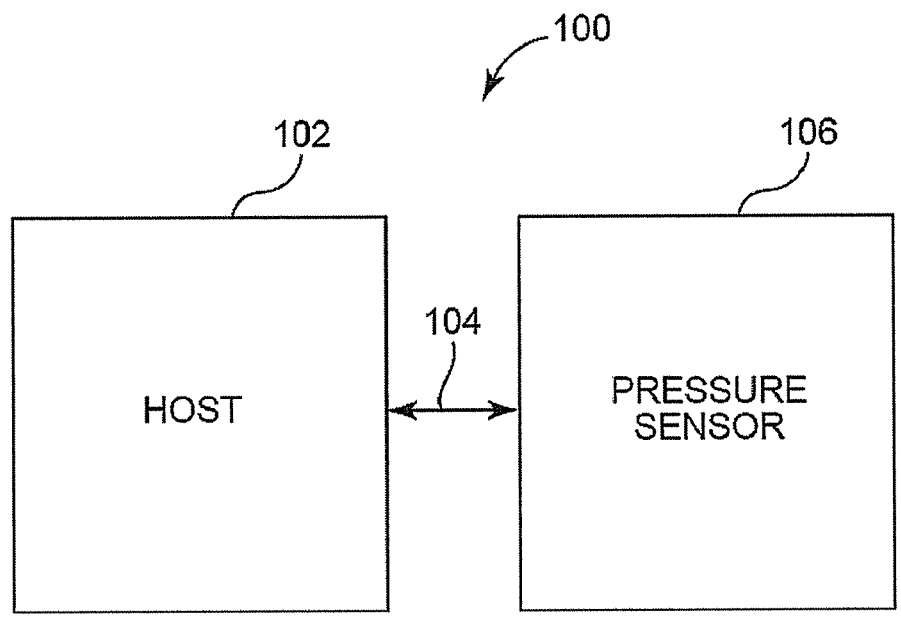
FIG. 1 is a block diagram illustrating one embodiment of a system.

FIG. 1 is a block diagram illustrating one embodiment of a system 100. System 100 includes a host 102 and a pressure sensor 106. Host 102 is communicatively coupled to pressure sensor 106 through communication link 104. Host 102 includes a microprocessor, computer, controller, or any other suitable device for receiving data from pressure sensor 106. Pressure sensor 106 communicates pressure data to host 102 though communication link 104. In one embodiment, communication link 104 is a wireless communication link. In one embodiment, system 100 is part of an automobile and pressure sensor 106 is installed in an automotive component, such as a tire.

In one embodiment, pressure sensor 106 is a semiconductor device. In one embodiment, pressure sensor 106 includes a plurality of pressure sensor elements and a plurality of reference elements. In one embodiment, the pressure sensor elements and reference elements are configured in a Wheatstone bridge configuration for sensing an applied pressure. The pressure sensor elements include a thermal selftest. In one embodiment of the thermal selftest, a diaphragm of each pressure sensor element is heated to induce deflection of the diaphragm. By sensing the induced deflection of the diaphragm in response to the heating, the pressure sensor element is tested to verify that it is operating correctly. In another embodiment of the thermal selftest, a gas filled cavity, which is defined in part by the diaphragm, is heated to increase the pressure of the gas. The increased pressure of the gas induces deflection of the diaphragm. By sensing the induced deflection of the diaphragm in response to the heating, the pressure sensor element is tested to verify that it is operating correctly.

In one embodiment, each pressure sensor element is micromachined and includes a diaphragm and sensor elements to detect movement of the diaphragm in response to an applied pressure. The sensor elements include capacitive elements, piezoresistive elements, or other suitable sensor elements for detecting movement of the diaphragm. The reference elements are micromachined to match the pressure sensor elements, however, the diaphragms of the reference elements are fixed such that the sensor elements of the reference elements provide a constant value independent of the applied pressure.

As used herein, the term "electrically coupled" is not meant to mean that the elements must be directly coupled together and intervening elements may be provided between the "electrically coupled" elements.

Figure 2:
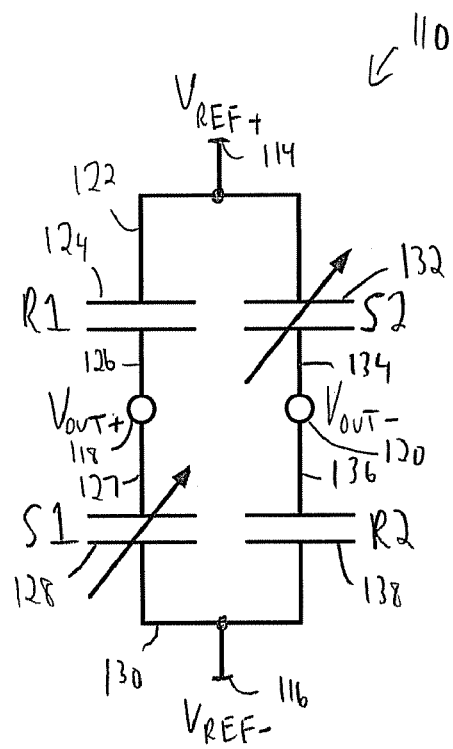
FIG. 2 is a diagram illustrating one embodiment of a pressure sensor.

FIG. 2 is a diagram illustrating one embodiment of a pressure sensor 110. In one embodiment, pressure sensor 110 provides pressure sensor 106 previously described and illustrated with reference to FIG. 1. Pressure sensor 110 includes a first reference element (R1) 124, a second reference element (R2) 138, a first sensor element (S1) 128, and a second sensor element (S2) 132. First reference element 124 is substantially identical to second reference element 138. First sensor element 128 is substantially identical to second sensor element 132.

In one embodiment, first sensor element 128 and second sensor element 132 are micromachined pressure sensor cells including diaphragms that deflect in response to applied pressure. First sensor element 128 and second sensor element 132 include capacitive sensor elements, piezoresistive sensor elements, or other suitable sensor elements for sensing the deflection of the diaphragm. In one embodiment, first sensor element 128 and second sensor element 132 have a capacitance that varies in response to the applied pressure.

In one embodiment, first reference element 124 and second reference element 138 are fabricated using the same micromachining process used to fabricate first sensor element 128 and second sensor element 132. First reference element 124 and second reference element 138, however, include an oxide pillar below the diaphragm that prevents the diaphragm from deflecting under an applied pressure. In one embodiment, first reference element 124 and second reference element 138 have a constant capacitance independent of applied pressure.

One side of first reference element 124 is electrically coupled to a first or positive reference voltage ($V_{REF+}$) 114 through signal path 122. The other side of first reference element 124 is electrically coupled to a first or positive voltage output ($V_{OUT+}$) node 118 through signal path 126. $V_{OUT+}$ node 118 is electrically coupled to one side of first sense element 128 through signal path 127. The other side of first sense element 128 is electrically coupled to a second or negative reference voltage ($V_{REF-}$) 116 through signal path 130. First reference element 124 and first sensor element 128 provide the left or first branch of the Wheatstone bridge.

One side of second sensor element 132 is electrically coupled to $V_{REF+}$ 114 through signal path 122. The other side of second sensor element 132 is electrically coupled to a second or negative voltage output ($V_{OUT-}$) node 120 through signal path 134. $V_{OUT-}$ node 120 is electrically coupled to one side of second reference element 138 through signal path 136. The other side of second reference element 138 is electrically coupled to $V_{REF-}$ 116 through signal path 130. Second sensor element 132 and second reference element 138 provide the right or second branch of the Wheatstone bridge.

First sensor element 128 and second sensor element 132 are arranged diagonally in the first and second branch of the Wheatstone bridge with first sensor element 128 in the lower portion of the Wheatstone bridge and second sensor element 132 in the upper portion of the Wheatstone bridge. As the applied pressure on first sensor element 128 increases, the capacitance increases and therefore the voltage increases at $V_{OUT+}$ node 118. As the applied pressure on second sensor element 132 increases, the capacitance increases and therefore the voltage decreases at $V_{OUT-}$ node 120. As such, there is an increase in the bridge voltage between $V_{OUT+}$ node 118 and $V_{OUT-}$ node 120 as the applied pressure on first sensor element 128 and second sensor element 132 increases. There is a decrease in the bridge voltage between $V_{OUT+}$ node 118 and $V_{OUT-}$ node 120 as the applied pressure on first sensor element 128 and second sensor element 132 decreases. By sensing the bridge voltage between $V_{OUT+}$ node 118 and $V_{OUT-}$ node 120, the pressure applied to pressure sensor 110 is determined.

FIG. 3 is a diagram illustrating one embodiment of a pressure sensor element 140 in a first state 142a. In one embodiment, pressure sensor element 140 provides first pressure sensor element 128 and second pressure sensor element 132 previously described and illustrated with reference to FIG. 2. Pressure sensor element 140 includes a base 142, sidewalls 144, a diaphragm 148, and sensor elements (not shown). Base 142, sidewalls 144, and diaphragm 148 define a sealed cavity 146. In one embodiment, cavity 146 includes a vacuum. In another embodiment, cavity 146 is filled with a gas, such as air, $N_2$, Ar, $CO_2$, or other suitable gas.

In one embodiment, diaphragm 148 includes a separate heater 150, such as a resistor. In another embodiment, the diaphragm itself provides the heater. In state 142a, there is no current passing through heater 150 or diaphragm 148 and therefore there is no heating of diaphragm 148. In state 142a, pressure sensor element 140 can be operated to obtain pressure measurements.

FIG. 4 is a diagram illustrating another embodiment of pressure sensor element 140 in a second state 142b. In state 142b, pressure sensor element 140 is undergoing a thermal selftest. During the thermal selftest, a current is applied through heater 150 or diaphragm 148 by a circuit 152. In one embodiment, circuit 152 includes a voltage source or another suitable circuit for applying a current through heater 150 or diaphragm 148. In one embodiment, different current paths through diaphragm 148 are selected by selecting contacts in different locations as source and sink connections for the applied current. In one embodiment, asymmetric current paths are selected to provide asymmetric stress in diaphragm 148. This can be used, for example, to create stress maxima at local sensing elements in the case of a piezoresistive sensor element.

The current heats diaphragm 148. In response to the heating, diaphragm 148 experiences a larger temperature rise than base 140 and sidewalls 144. The larger temperature rise of diaphragm 148 leads to a greater mechanical extension of diaphragm 148 than base 140 and sidewalls 144. The mechanical extension of diaphragm 148 induces deflection of diaphragm 148. The amount of induced deflection of diaphragm 148 is based on the current or power applied to heater 150 or diaphragm 148. By sensing the induced deflection of diaphragm 148 in response to the heating, pressure sensor element 140 is tested to verify that it is operating correctly.

FIG. 5 illustrates a cross-sectional view of another embodiment of a pressure sensor 160. In one embodiment, pressure sensor 160 provides pressure sensor 106 previously described and illustrated with reference to FIG. 1. Pressure sensor 160 is a semiconductor device including a substrate 162, an electrode 164, a cavity 166, a diaphragm 168, contacts 174, 176, and 178, and dielectric material 170 and 172. In one embodiment, pressure sensor 160 includes n-MOS circuits 180 and/or p-MOS circuits 182.

Substrate 162 includes a silicon substrate or another suitable substrate. The n-MOS circuits 180 and/or p-MOS circuits 182 are formed on substrate 162. A pressure sensor element including electrode 164, cavity 166, and diaphragm 168 is formed on substrate 162. In one embodiment, cavity 166 includes a vacuum. In one embodiment, diaphragm 168 provides a first electrode of a capacitive sensing element and electrode 164 provides a counter electrode for the capacitive sensing element. Contacts 174 and 176 are electrically coupled to diaphragm 168. Contact 178 is electrically coupled to electrode 164. Diaphragm 168 includes polysilicon or another suitable material. A dielectric material stack including dielectric material 170 and 172 is formed over diaphragm 168. In one embodiment, dielectric material 170 and 172 include $SiO_2$, SiN, or other suitable dielectric material.

During operation, a pressure applied to diaphragm 168 as indicated at 184 results in a deflection of diaphragm 168. The deflection of diaphragm 168 is sensed by measuring the capacitance between diaphragm 168 and counter electrode 164. During a thermal selftest, current is applied through diaphragm 168 between contacts 174 and 176 to heat the diaphragm. In response to the heating of diaphragm 168, diaphragm 168 deflects by an amount based on the applied heating current. The deflection of diaphragm 168 is sensed by measuring the capacitance between diaphragm 168 and counter electrode 164. In this way, pressure sensor 160 is tested to verify that it is operating correctly.

Figure 6:
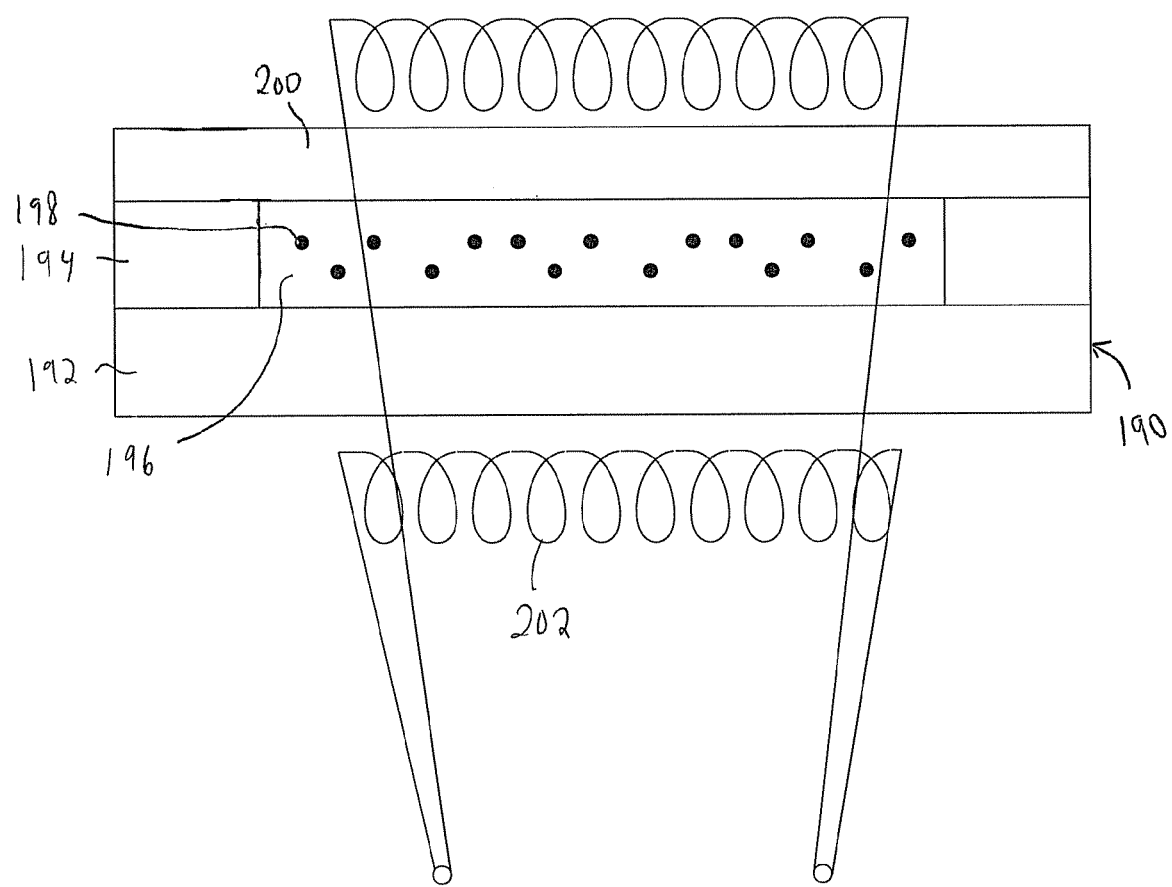
FIG. 6 is a diagram illustrating another embodiment of a pressure sensor element.

FIG. 6 is a diagram illustrating another embodiment of a pressure sensor element 190. In one embodiment, pressure sensor element 190 provides first pressure sensor element 128 and second pressure sensor element 132 previously described and illustrated with reference to FIG. 2. Pressure sensor element 190 includes a base 192, sidewalls 194, a diaphragm 200, and sensor elements (not shown). Base 192, sidewalls 194, and diaphragm 200 define a sealed cavity 196. Cavity 196 is filled with a gas 198, such as air, $N_2$, Ar, $CO_2$, or other suitable gas.

In this embodiment, a heater 202, such as a resistor, surrounds at least a portion of pressure sensor element 190. In one embodiment, heater 202 and pressure sensor element 190 are part of a single semiconductor device. In another embodiment, pressure sensor element 190 is part of a semiconductor device and heater 202 is external to the semiconductor device. With heater 202 turned off, pressure sensor element 190 can be operated to obtain pressure measurements. With heater 202 turned on, gas 198 is heated thereby changing the pressure inside sealed cavity 196. The change in pressure inside sealed cavity 196 induces deflection of diaphragm 200. The amount of deflection of diaphragm 200 is based on the amount of heating of gas 198. The amount of heating of gas 198 is controlled by controlling the current applied through heater 202. By sensing the deflection of diaphragm 200, pressure sensor element 190 is tested to verify that it is operating correctly. If pressure sensor element 190 is damaged and gas 198 escapes, the response of pressure sensor element 190 will be significantly different than the expected response during the thermal selftest. In this way, the thermal selftest will indicate whether pressure sensor element 190 has failed.

Figure 7:
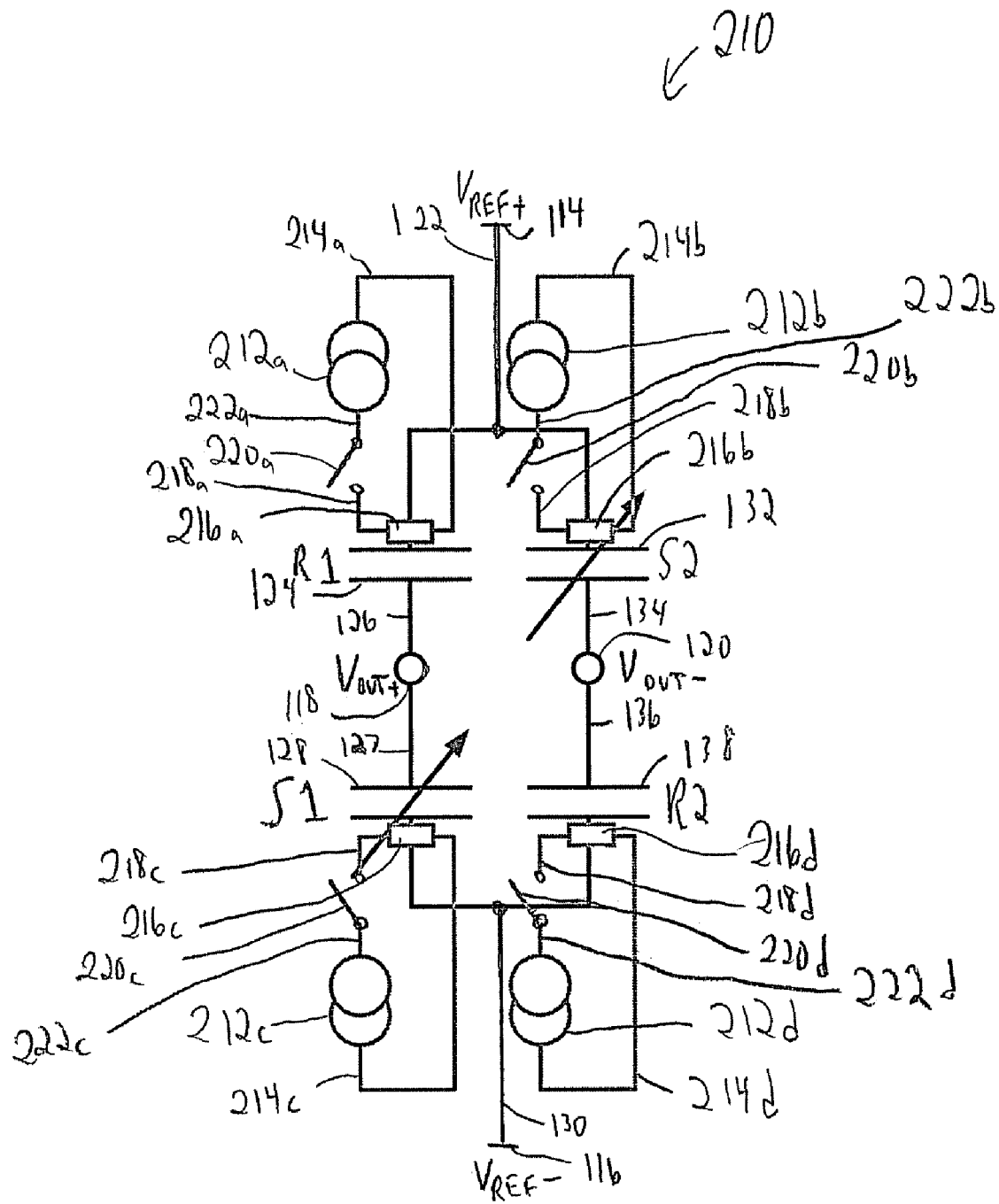
FIG. 7 is a diagram illustrating another embodiment of a pressure sensor.

FIG. 7 is a diagram illustrating another embodiment of a pressure sensor 210. Pressure sensor 210 is similar to pressure sensor 110 previously described and illustrated with reference to FIG. 2, except that pressure sensor 210 also includes current sources 212a-212d, heaters 216a-216d, and switches 220a-220d. One side of current source 212a-212d is electrically coupled to one side of heater 216a-216d through signal path 214a-214d, respectively. The other side of heater 216a-216d is electrically coupled to one side of switch 220a-220d through signal path 218a-218d, respectively. The other side of switch 220a-220d is electrically coupled to the other side of current source 212a-212d through signal path 222a-222d, respectively.

In response to a control circuit (not shown) opening a switch 220a-220d, the associated heater 216a-216d is disabled. In response to a control circuit closing a switch 220a-220d, the associated heater 216a-216d is enabled. With heater 216a enabled, heater 216a heats the diaphragm of first reference element 124. With heater 216b enabled, heater 216b heats the diaphragm of second sensor element 132. With heater 216c enabled, heater 216c heats the diaphragm of first sensor element 128. With heater 216d enabled, heater 216d heats the diaphragm of second reference element 138.

In one embodiment, heater 216a is separate or external from the diaphragm of first reference element 124. Heater 216b is separate or external from the diaphragm of second sensor element 132. Heater 216c is separate or external from the diaphragm of first sensor element 128, and heater 216d is separate or external from the diaphragm of second reference element 138. In another embodiment, the diaphragm of first reference element 124 itself provides heater 216a or heater 216a is internal to the diaphragm. The diaphragm of second sensor element 132 itself provides heater 216b or heater 216b is internal to the diaphragm. The diaphragm of first sensor element 128 itself provides heater 216c or heater 216c is internal to the diaphragm, and the diaphragm of second reference element 138 itself provides heater 216d or heater 216d is internal to the diaphragm.

In one embodiment, a thermal selftest is performed by selectively enabling one or more of heaters 216a-216d to induce a change in the bridge voltage between $V_{OUT+}$ node 118 and $V_{OUT-}$ node 120 independent of the pressure applied to pressure sensor 210. By sensing the change in the bridge voltage in response to the heating, pressure sensor 210 is tested to verify that it is operating correctly. In one embodiment, heaters 216b and 216c are sequentially enabled to induce changes in the bridge voltage. The step heights of the induced changes in the bridge voltage are sensed and compared to check the matching of the heated first sensor element 128 and the heated second sensor element 132.

Embodiments provide pressure sensors including a thermal selftest. In one embodiment, the diaphragm of the pressure sensor is heated to induce deflection of the diaphragm. In another embodiment, a gas within the sealed cavity of the pressure sensor is heated to induce deflection of the diaphragm. In either case, the deflection of the diagram in response to the heating is sensed to determine whether the pressure sensor is operating correctly.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor device comprising:
   a diaphragm,
   a sensing element configured to sense deflection of the diaphragm; and
   a circuit configured to heat the diaphragm to induce deflection of the diaphragm,
   wherein the circuit is configured to control the amount of induced deflection of the diaphragm by controlling a current through the diaphragm, and
   wherein the circuit is configured to select different current paths through the diaphragm by selecting contacts in different locations as source and sink connections for the current through the diaphragm.

2. The semiconductor device of claim 1, wherein the diaphragm comprises silicon.

3. The semiconductor device of claim 1, further comprising:
   a heater within the diaphragm, the heater electrically coupled to the circuit.

4. The semiconductor device of claim 1, wherein at least one of the current paths comprises an asymmetric current path to provide asymmetric stress in the diaphragm.

5. The semiconductor device of claim 1, wherein the sensing element comprises one of a capacitive sensing element and a piezoresistive sensing element.

6. A pressure sensor comprising:
   a diaphragm,
   a sensing element configured to sense deflection of the diaphragm;
   a gas sealed within a cavity, a portion of the cavity defined by the diaphragm; and
   a circuit configured to heat the gas to induce deflection of the diaphragm.

7. The pressure sensor of claim 6, further comprising:
a heater surrounding at least a portion of the cavity, the heater electrically coupled to the circuit.

8. The pressure sensor of claim 7, wherein the circuit is configured to control the amount of induced deflection of the diaphragm by controlling a current through the heater.

9. The pressure sensor of claim 7, wherein the diaphragm, the sensing element, the cavity, the circuit, and the heater are combined in a semiconductor device.

10. The pressure sensor of claim 6, wherein the sensing element comprises one of a capacitive sensing element and a piezoresistive sensing element.

11. A method for testing a pressure sensor, the method comprising:
heating a diaphragm of a pressure sensor; and
sensing an induced deflection of the diaphragm in response to the heating with a capacitive sensor element.

12. The method of claim 11, wherein heating the diaphragm comprises applying a current through a heater within the diaphragm.

13. The method of claim 12, wherein heating the diaphragm comprises controlling the current through the heater to control the amount of induced deflection of the diaphragm.

14. The method of claim 11, wherein heating the diaphragm comprises applying a current through the diaphragm, the diaphragm comprising silicon.

15. The method of claim 14, wherein heating the diaphragm comprises controlling the current through the diaphragm to control the amount of induced deflection of the diaphragm.

16. A method for testing a pressure sensor, the method comprising:
heating a gas within a sealed cavity of a pressure sensor, the pressure sensor including a diaphragm defining a portion of the cavity; and
sensing an induced deflection of the diaphragm in response to the heating.

17. The method of claim 16, wherein heating the gas comprises applying a current through a heater surrounding at least a portion of the cavity.

18. The method of claim 17, wherein heating the gas comprises controlling the current through the heater to control the amount of induced deflection of the diaphragm.

19. The method of claim 16, wherein sensing the induced deflection of the diaphragm comprises sensing the induced deflection of the diaphragm with one of a capacitive sensor element and a piezoresistive sensor element.

20. A system comprising:
a host; and
a pressure sensor communicatively coupled to the host, the pressure sensor comprising at least two sensor elements and at least two reference elements arranged in a Wheatstone bridge configuration, the reference elements each comprising a first diaphragm and an oxide pillar that prevents the first diaphragm from deflecting under an applied pressure, the sensor elements diagonal to each other within the Wheatstone bridge, and each sensor element comprising:
a sealed cavity defined at least in part by a second diaphragm;
a sensing element configured to sense deflection of the second diaphragm; and
a circuit configured to selectively heat a gas within the sealed cavity or to selectively heat the second diaphragm to induce deflection of the second diaphragm.

21. The system of claim 20, wherein the pressure sensor is configured to sequentially heat each second diaphragm of the at least two sensor elements for checking whether the at least two sensor elements are matched.

22. The system of claim 20, wherein the host is within an automobile, and wherein the pressure sensor is within an automotive component of the automobile.

23. The system of claim 20, wherein the sensing element configured to sense deflection of the second diaphragm comprises a capacitive sensor element.

* * * * *